United States Patent [19]

Garnweidner

[11] Patent Number: 5,066,064
[45] Date of Patent: Nov. 19, 1991

[54] DOOR ASSEMBLY FOR A PASSENGER VEHICLE

[75] Inventor: Peter Garnweidner, Lamprechtshausen, Austria

[73] Assignee: Austria Metall Aktiengesellschaft, Braunau am Inn, Austria

[21] Appl. No.: 607,166

[22] Filed: Oct. 31, 1990

[30] Foreign Application Priority Data

Nov. 2, 1989 [AT] Austria .................................. 2527/89

[51] Int. Cl.⁵ .............................................. B60J 5/04
[52] U.S. Cl. ..................................... 296/146; 296/189; 188/371
[58] Field of Search ............... 296/188, 146, 905, 189; 188/371, 377

[56] References Cited

U.S. PATENT DOCUMENTS

| 3,468,182 | 9/1969 | Shwartzberg | 188/371 |
| 3,819,228 | 6/1974 | Cornacchia | 296/188 |
| 4,488,751 | 12/1984 | Kling | 296/188 |
| 4,684,166 | 8/1987 | Kanodia | 296/188 |

FOREIGN PATENT DOCUMENTS 2816318 10/1978 Fed. Rep. of Germany ...... 296/146

Primary Examiner—Robert R. Song
Attorney, Agent, or Firm—Herbert Dubno

[57] ABSTRACT

A vehicle door, for a passenger automobile which in the closed position has its door frame juxtaposed with the outwardly facing part of the threshold for the door opening of the vehicle body, is provided at the level of this threshold with a horizontal strut which can be corrugated for controlled collapse and extends normal to the door plane.

11 Claims, 3 Drawing Sheets

DOOR ASSEMBLY FOR A PASSENGER VEHICLE

FIELD OF THE INVENTION

The present invention relates to a door assembly for a passenger automobile and, more particularly, to improvements in such door assemblies to provide increased passenger and driver safety. Specifically, the invention relates to a door assembly of the type in which the lower part of the frame of the door which faces inwardly, confronts an outwardly facing part of the threshold of the door opening in a closed position of the door or a part which may be attached to the threshold.

In this description, the reference to a threshold member is intended to identify the threshold structure itself or such a member or part which may be attached to and forms a structural unit with the threshold.

BACKGROUND OF THE INVENTION

Doors of the latter type have been in use in recent years in passenger vehicles because this construction provides a better protection of the passenger compartment against lateral impact or collision than does a door in which the threshold merely underlies the frame of the swingable door in the closed position thereof and also because the door can prevent soiling of the threshold and protect it from minor damage which might affect a threshold underlying the door.

For a variety of passenger automobiles and especially European-constructed passenger automobiles intended for sale in the United States, it is common to provide a door reinforcing beam in the vehicle door which extends horizontally at bumper height to provide impact resistance in the case of a lateral impact.

In accidents in which the collision results in an impact below such reinforcing beams, the reinforcement element is of little help and is not capable of providing significant protection. The collision force readily deforms the outer skin of the door inwardly since the skin provides little energy dissipation or resistance to such impact. The door frame is readily deformed and, if the threshold member is laterally juxtaposed with the lower portion of the frame, the threshold member can be deformed as well.

The entire system provides little deformation resistance or energy dissipation although the vehicle body offers ample opportunity to dissipate some of this energy by being able to take up some of the impact energy and a substantial vehicle body strength is available at the threshold member. In other words, the vehicle body does not provide, for such impacts, a deformation resistance capable of utilizing the girder and beam strengths of the vehicle body. If, of course, the full deformation thereof can be brought into play with such collisions, a greater ability to protect passenger and driver can be gained.

Of course, that requires that the deformation energy be taken up in the door and that the door provide an ample deformation resistance, indeed a deformation resistance which is sufficient to dissipate the energy of impact to a degree that the beams and girders of the passenger compartment will not be plastically deformed.

OBJECTS OF THE INVENTION

It is, therefore, the principal object of the invention to provide an improved door assembly which can utilize the considerations outlined above with respect to maximizing passenger safety, which is effective to safeguard passengers against collisions which might result in impacts in the door below the outer reinforcement beams.

Another object of the invention is to provide a relatively high resistance to collision in regions below the reinforcement beams generally provided in such doors and to enable the full stiffness of the vehicle body and particularly the passenger compartment to be utilized to reduce the effect of such impacts.

Still another object of the invention is to provide an improved door assembly which is free from disadvantages of earlier systems.

SUMMARY OF THE INVENTION

These objects and others which will become apparent hereinafter are attained, in accordance with the invention, in a door assembly for a passenger automobile which comprises:

a vehicle body formed with a door opening and a threshold member extending horizontally along a bottom portion of the door opening;

a vehicle door lying in a door plane, swingably mounted on the vehicle body and having a door frame laterally juxtaposed with the threshold member at a lower portion thereof above a bottom edge of the door, and an outer door skin spanning the door frame; and a horizontal strut disposed between the door frame and the skin in the door at a level with the threshold member, the strut extending normal to the plane of the door.

According to the invention, therefore, in the door, a horizontal strut is provided between the door frame and the outer skin of the door which lies at a level of the threshold member, i.e. the threshold or a member forming a static structure therewith and juxtaposed with this door frame internally thereof in a closed position of the door, this strut extending generally perpendicular to the plane of the frame and, therefore, also normal to the skin.

Preferably, this strut is collapsible with energy dissipation, i.e. has a resistance to deformation that is maintained as it collapses so that most of the impact energy can be dissipated at forces less than those necessary to permanently deform the threshold member and the beams or girders of the body which may be connected thereto.

When relatively high door thresholds are employed as have been increasingly common of late in passenger vehicles, it is even possible to eliminate the standard bumper level impact girders which have been provided in passenger vehicle doors or to dimension such girders so that they are of lesser weight and smaller size, since the impact resistance or pressing effect of the strut is sufficient to provide the desired protection of the passengers. This has been demonstrated by tests according to the United States Test Standard for doors US-S214. In this test, a cylinder ram, located approximately in the center of the door, is driven against the latter and the deformation of the door and the resistance force developed thereby are measured.

It has been found to be advantageous to provide this strut substantially midway along the length of the door, i.e. the dimension of the door parallel to the longitudinal axis of the vehicle or in the direction of travel of the vehicle. This allows the strut to be relatively small and thus of comparatively low weight. A weight saving, of course, is tantamount to energy saving.

According to a feature of the invention, the ends of the strut are provided with platelike abutments, only one of which is secured to the door frame while the other is juxtaposed with the skin of the door, preferably with a spacing therefrom.

The two plates are connected by at least one and preferably two corrugated or accordian-pleated walls with generatrices parallel to the plates. When the strut has two such walls, they have corrugations which are opposite one another, i.e. the troughs of one wall open opposite troughs of the other wall and the crests of the corrugations of the two walls bulge toward one another for corresponding corrugations.

This construction allows simple mounting of the strut in the door and the particular corrugation configuration can allow the resistance to deformation to be adjusted to the particular need. An important aspect of the invention is that the corrugation permit controlled collapse of the strut over a deformation path which may be selected so that, although the strut is additionally braced by the high threshold through the frame of the door, there is minimum deformation of the vehicle body girders or beams. The double wall construction permits dissipation of the energy effectively over the entire deformation path, especially if the strut is not closed at its sides.

Advantageously, moreover, the strut is a one piece light metal extruded profile or structural shape. The light metal can be a lithium, aluminum or magnesium alloy.

This construction allows an extruded structural shape to be formed continuously and permits the individual struts to be cut from the profile with any needed length. The requisite holes for screw adjustment to the frame can be drilled and the strut bolted in place.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
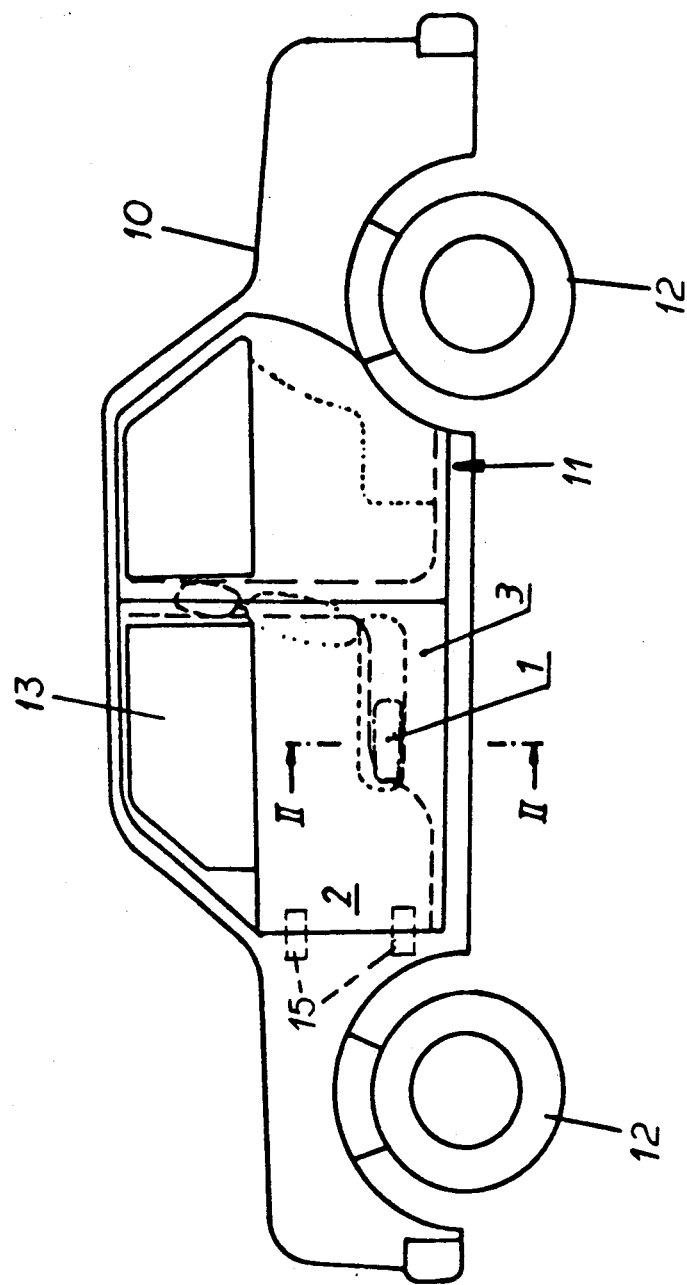
FIG. 1 is an elevational view showing principals of the invention.

In FIG. 1 there is shown a passenger vehicle 1? with a vehicle body 11, wheels 12 and a passenger compartment 13 closed by a door 2. The latter is swingably mounted on the vehicle body by hinges 15 and closes a door opening which has been indicated at 16.

Figure 2:
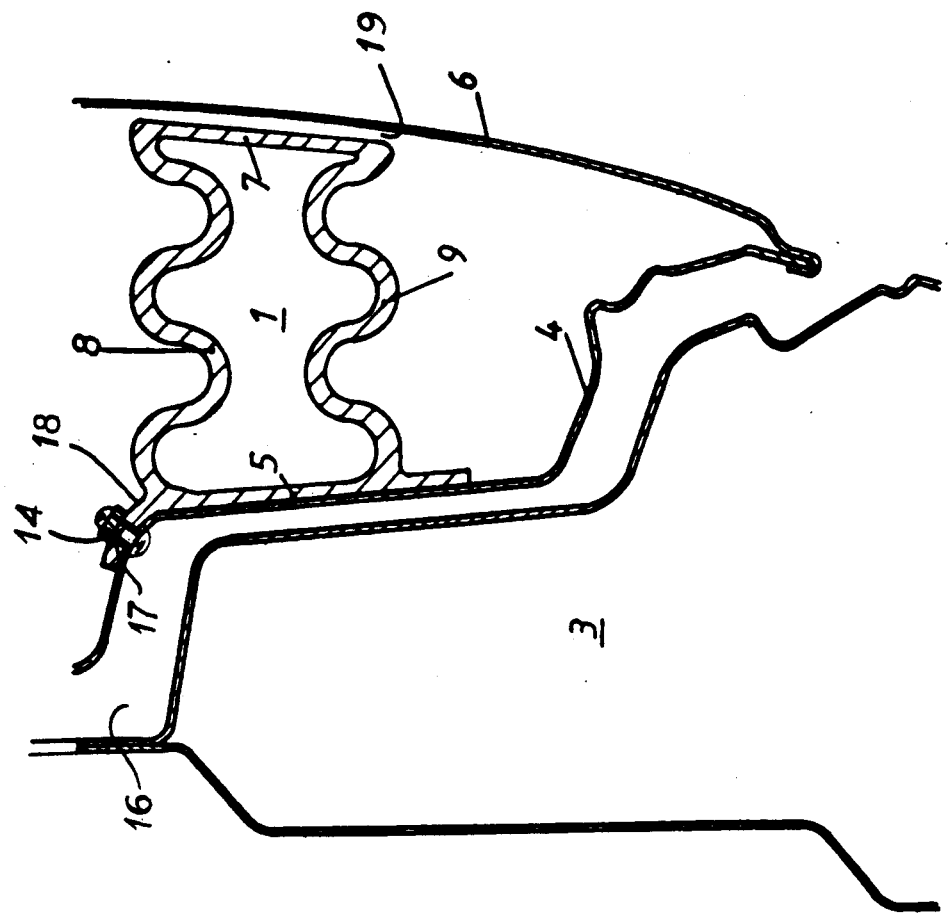
FIG. 2 is an enlarged section taken along the lines II-II of FIG. 1.
Figure 3:
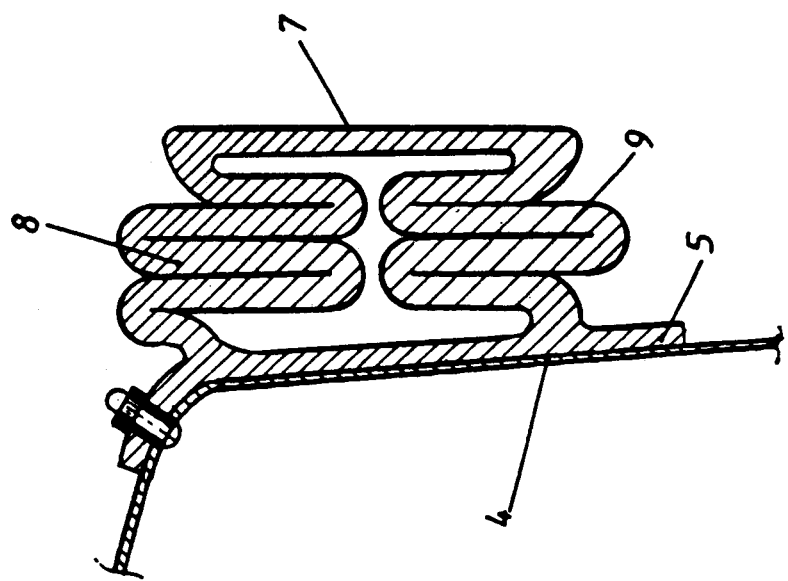
FIG. 3 is a fragmentary view similar to FIG. 2 but showing the strut in a collapsed form as might result from a collision.

The strut I is shown in FIGS. 2 and 3, but its location is indicated at 1 in FIG. 1 and can be seen to be located in the vehicle door 2 laterally ahead of the threshold 3 and lying horizontally, i.e. perpendicular to the plane of the paper in FIG. 1.

In the illustrated embodiment, the threshold 3 can be seen in this region to be raised. Its upper contour is shown by a heavy dashed line As a result, the resistance to impact at the level of the strut 1 is increased since the strut 1 is braced not only against the door frame upon such impact but also by the elevated threshold 3.

As can be seen from FIGS. 2 and 3, the strut 1 is fastened on the door frame 4 by bolts 14 passing through holes 17 in a flange 15 of an abutment plate 5 of the strut 1. The abutment plate 5 rests directly against the door frame 4 to which it conforms in shape to provide good force transfer therebetween.

Between the outer skin 6 of the door and the abutment plate 7 of the strut 1, a gap 19 is provided to prevent chattering or noise upon vibration of the door and to permit water to flow along the inside of the outer skin of the door.

The abutment plates 5 and 7 are interconnected by two corrugated walls 8 and 9 with the corrugations being opposite one another so that they form spaced apart constructions of the strut 1. The sides normal to the two walls 8 and 9 are not closed and thus the formation of condensate is avoided. Furthermore, this allows the wall to fold upon impact as a comparison of FIGS. 2 and 3 will show.

Upon impact, therefore, the frame 4 may press against the threshold 3 and the skin 6 can be deformed against the plate 7 to provide an initial resistance to impact. The resistance to impact is maintained over the deformation path provided by collapse of the strut 1, thereby dissipating the energy of impact.

I claim:

1. A door assembly for an automotive vehicle, comprising:

a vehicle body formed with a door opening and a threshold member extending horizontally along a bottom portion of said door opening;

a vehicle door lying in a door plane, swingably mounted on said vehicle body and having a door frame laterally juxtaposed with said threshold member at a lower portion thereof above a bottom edge of said door, and an outer door skin spanning said door frame; and a horizontal strut positioned at a location substantially midway along a length of said door and disposed between said door frame and said skin in said door at a level with said threshold member, said strut extending normal to said plane of the door and being formed at opposite ends with abutment plates respectively juxtaposed with said frame and said skin, means being provided for securing the abutment plate juxtaposed with said frame to said frame, the abutment plate juxtaposed with said skin being spaced therefrom.

2. The door assembly defined in claim 1 wherein said abutment plates of said strut are interconnected by at least one corrugated or accordian-shaped wall having generatrices parallel to said plates.

3. The door assembly defined in claim 2 wherein said abutment plates of said strut are interconnected by two spaced apart corrugated walls having respective corrugations running oppositely and corresponding troughs opening toward one another and respective crests juxtaposed with one another.

4. The door assembly defined in claim 3 wherein said strut is formed in one piece from an extruded light-metal profile.

5. A door assembly for an automotive vehicle, comprising:

a vehicle body formed with a door opening and a threshold member extending horizontally along a bottom portion of said door opening;

a vehicle door lying in a door plane, swingably mounted on said vehicle body and having a door frame laterally juxtaposed with said threshold member at a lower portion thereof above a bottom edge of said door, and an outer door skin spanning said door frame; and a horizontal strut disposed between said door frame and said skin in said door at a level with said threshold member, said strut extending normal to said plane of the door, said strut being formed at opposite ends with abutment plates respectively juxtaposed with said frame and said skin, means being provided for securing the abutment plate juxtaposed with said frame to said frame, the abutment plate juxtaposed with said skin being spaced therefrom.

6. A door assembly for an automotive vehicle, comprising:

a vehicle body formed with a door opening and a threshold member extending horizontally along a bottom portion of said door opening;

a vehicle door lying in a door plane, swingably mounted on said vehicle body and having a door frame laterally juxtaposed with said threshold member at a lower portion thereof above a bottom edge of said door, and an outer door skin spanning said door frame; and a horizontal strut disposed between said door frame and said skin in said door at a level with said threshold member, said strut extending normal to said plane of the door and being formed with abutment plates at opposite sides thereof, said abutment plates of said strut being interconnected by at least one corrugated or accordian-shaped wall having generatrices parallel to said plates.

7. A door assembly for an automotive vehicle, comprising:

a vehicle body formed with a door opening and a threshold member extending horizontally along a bottom portion of said door opening;

a vehicle door lying in a door plane, swingably mounted on said vehicle body and having a door frame laterally juxtaposed with said threshold member at a lower portion thereof above a bottom edge of said door, and an outer door skin spanning said door frame; and a horizontal strut disposed between said door frame and said skin in said door at a level with said threshold member, said strut extending normal to said plane of the door and being formed with abutment plates at opposite sides thereof, said abutment plates of said strut being interconnected by two spaced apart corrugated walls having respective corrugations running oppositely and corresponding troughs opening toward one another and respective crests juxtaposed with one another.

8. The door assembly defined in claim 1 wherein said strut is formed in one piece from an extruded light-metal profile.

9. The door assembly defined in claim 5 wherein said strut is formed in one piece from an extruded light-metal profile.

10. The door assembly defined in claim 6 wherein said strut is formed in one piece from an extruded light-metal profile.

11. The door assembly defined in claim 7 wherein said strut is formed in one piece from an extruded light-metal profile.

* * * * *